Feb. 20, 1968  D. J. KURKA ET AL  3,369,264
JET LOADER
Filed Oct. 22, 1965  5 Sheets-Sheet 1
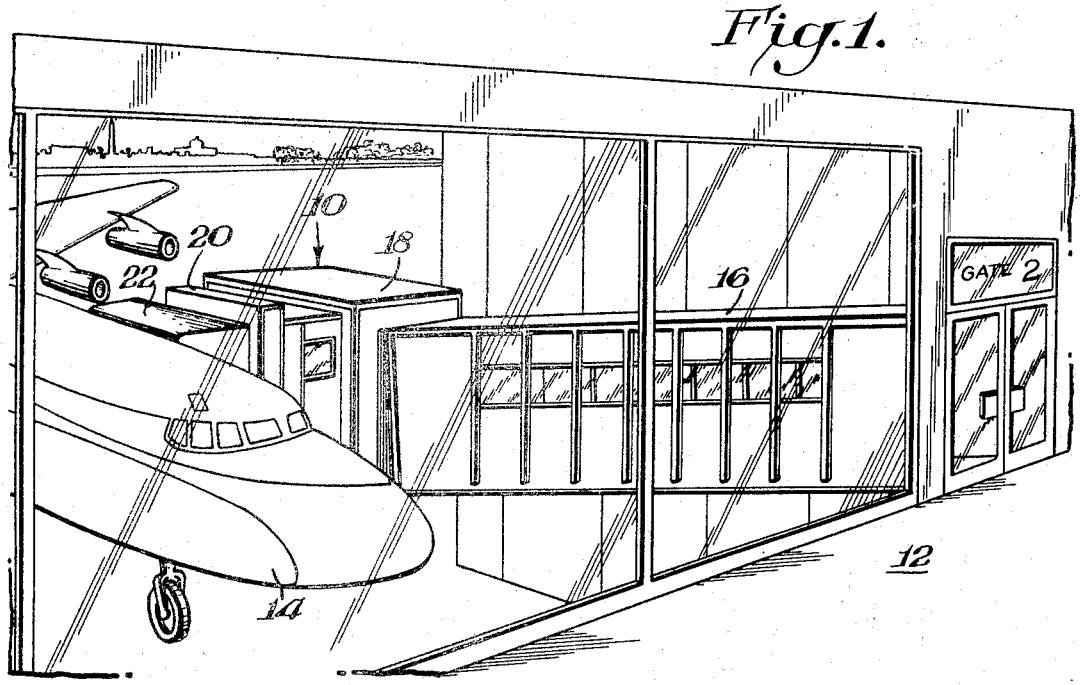
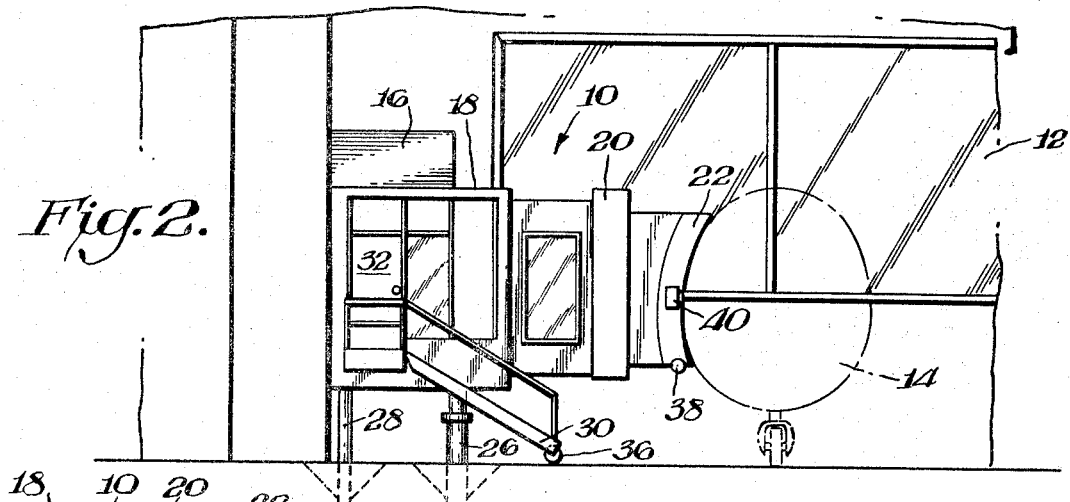
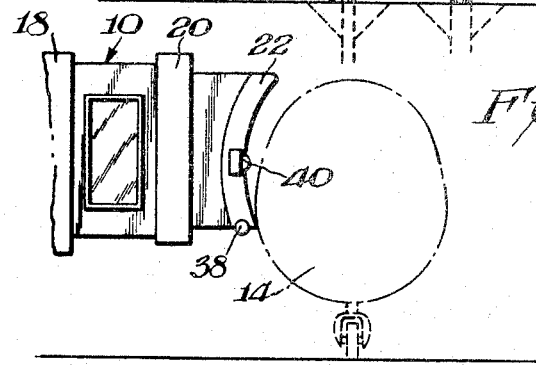
INVENTORS
David J. Kurka
Gordon Jacobson
Taylor D. Whitenack, Jr.
BY Connolly and Hutz
ATTORNEYS

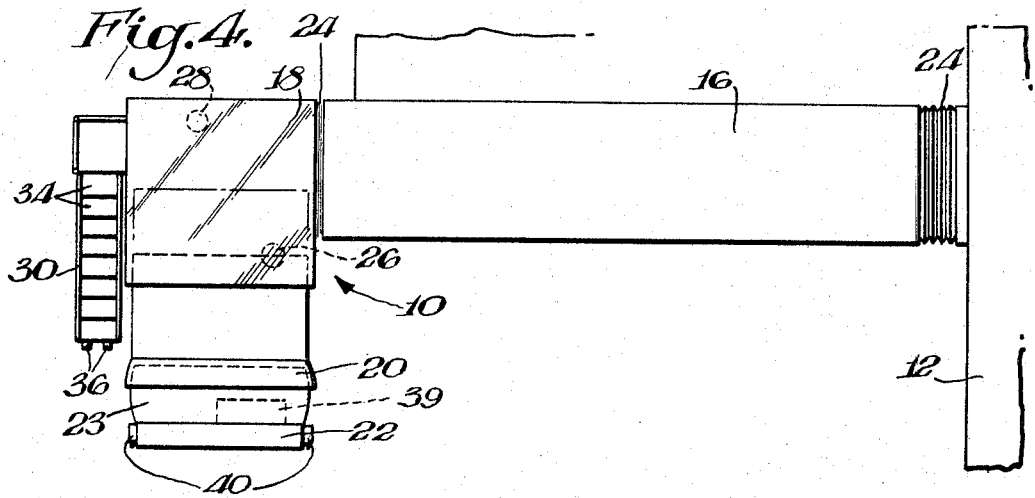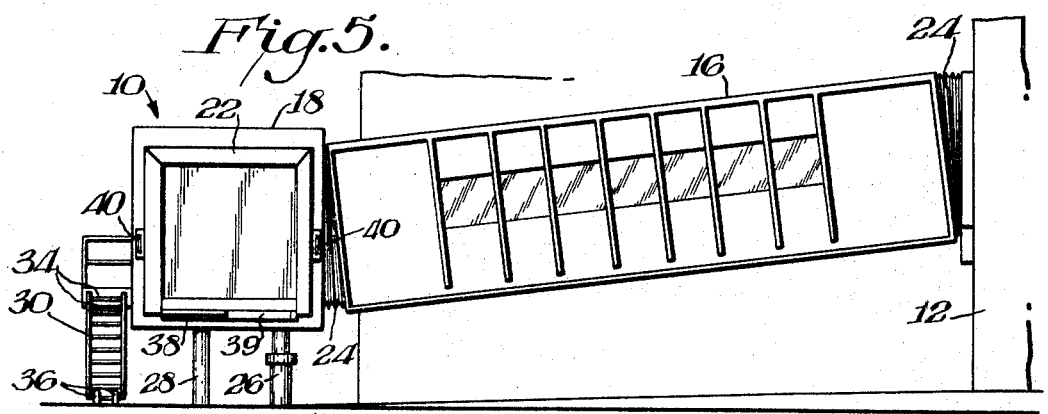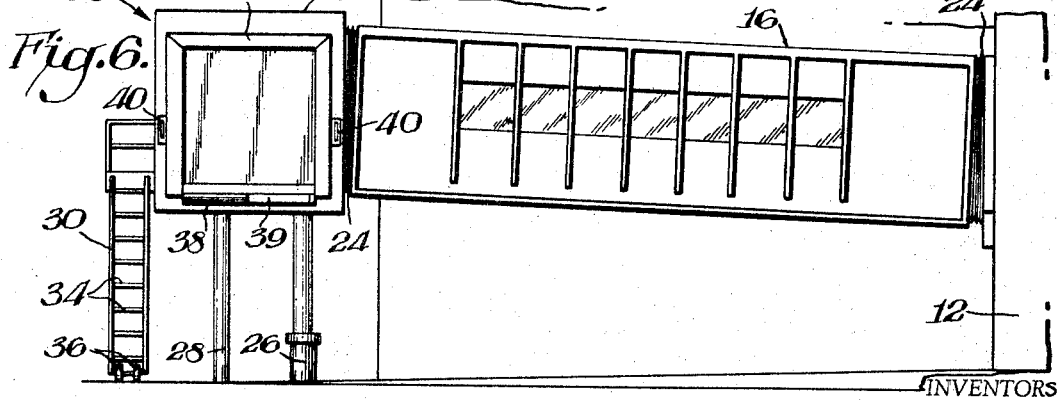

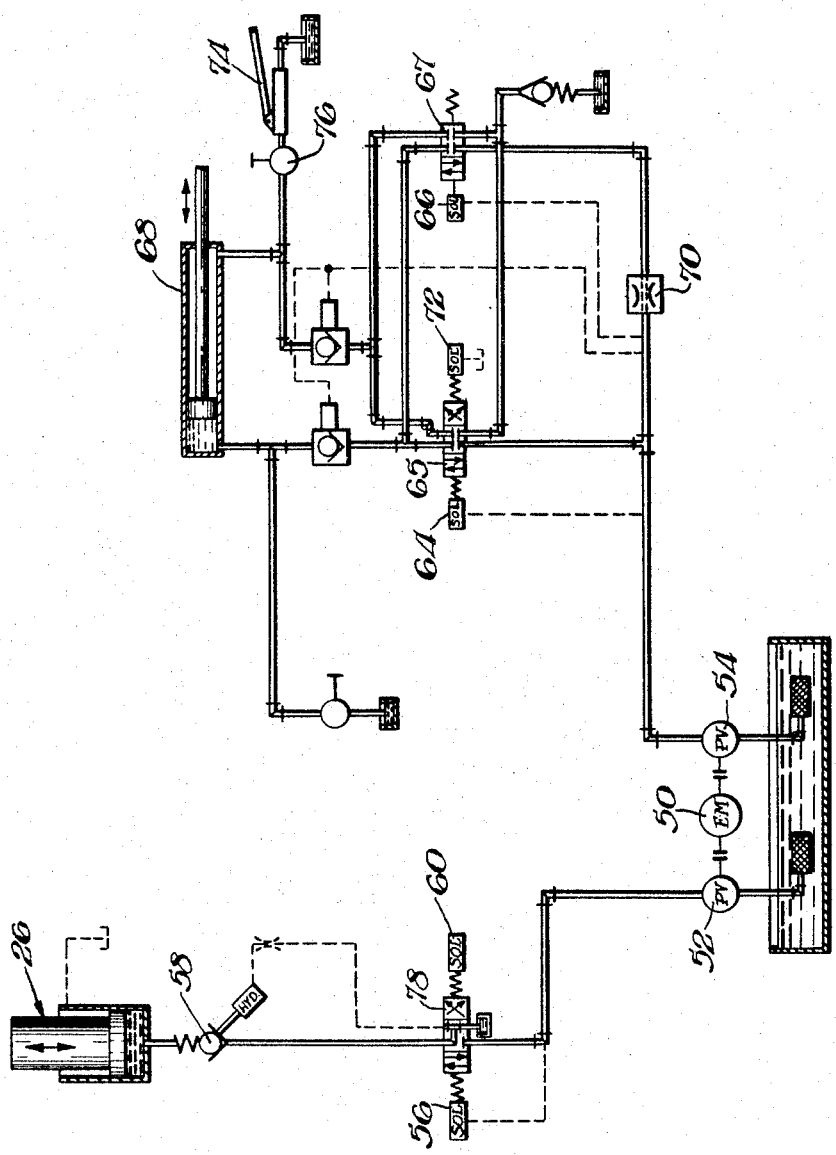

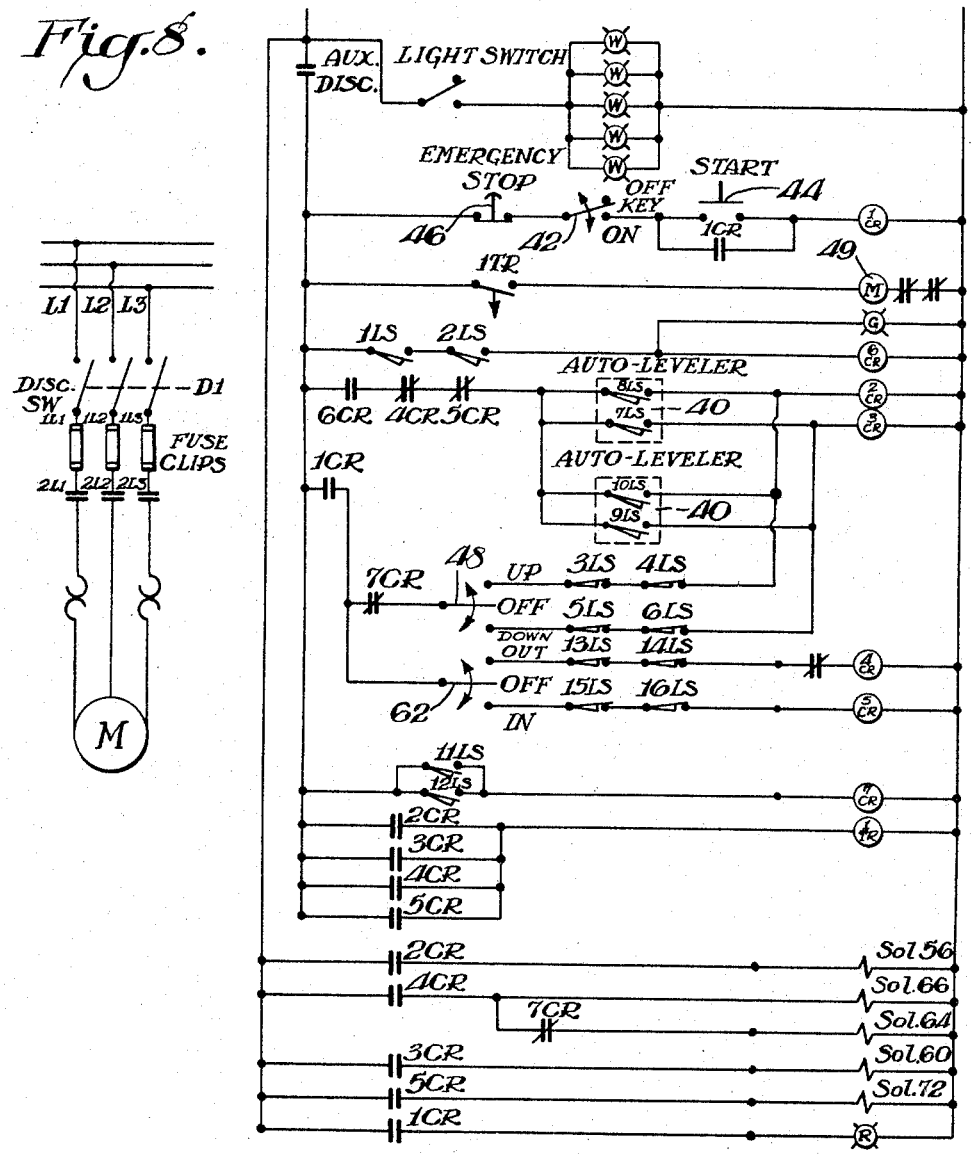

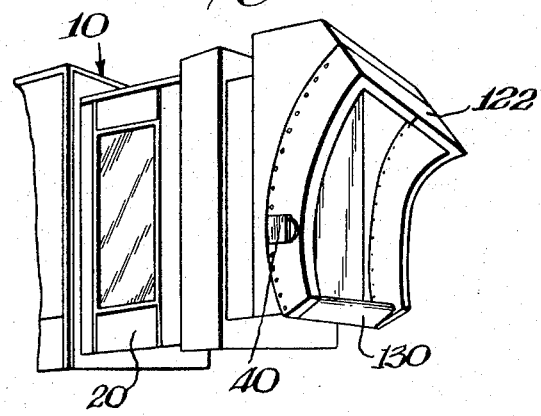
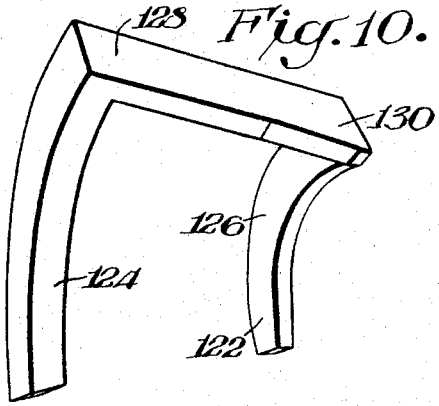
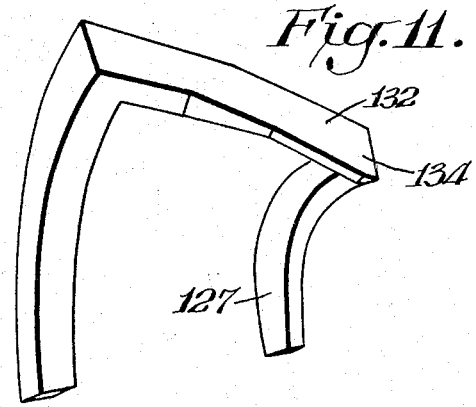
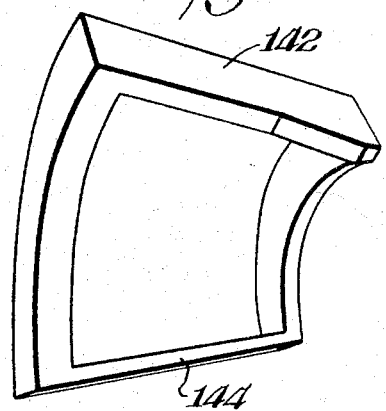
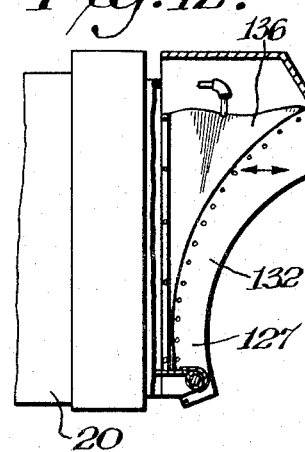
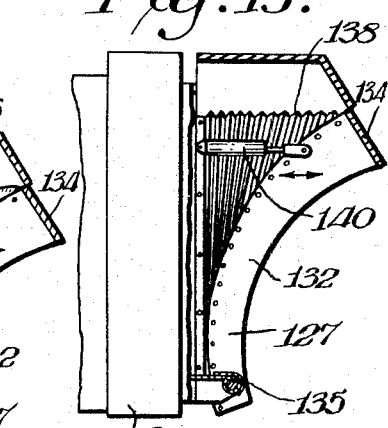

United States Patent Office 3,369,264
Patented Feb. 20, 1968

3,369,264
JET LOADER
David J. Kurka, Barrington, and Gordon Jacobson, Elmhurst, Ill., and Taylor D. Whitenack, Jr., Fort Wayne, Ind., assignors to Symington Wayne, Salisbury, Md., a corporation of Maryland
Filed Oct. 22, 1965, Ser. No. 501,779
3 Claims. (Cl. 14—71)

ABSTRACT OF THE DISCLOSURE

A loading ramp for bridging the gap between the airport terminal and the aircraft includes a tunnel which is pivoted to the terminal and a cab connected to the tunnel at right angles thereto with means for elevating and lowering the assembly and for extending and retracting the cab toward and away from the nose of an aircraft. The nose of the cab is particularly shaped to seal against the aircraft.

---

This invention relates to loading ramps for jet aircraft and more particularly to such loading ramps which are used in the nose loading of jet aircraft.

It is desirable for loading and unloading jet aircraft to be able to bring the aircraft as close as possible to the terminal. With present loading arrangements the ramps and their cabs are perpendicular to the terminal. Where the ramps are short there is a danger that the large wings of the aircraft may strike the terminal while positioning the aircraft near the loading ramp. To overcome this danger it has been necessary to resort to either very complicated or very long loading ramps.

An object of this invention is to provide a loading ramp which can be effectively used for the nose loading of jet aircraft.

A further object of this invention is to provide such a loading ramp which is sufficiently versatile to accommodate a large variety of different types of aircraft.

In accordance with this invention the loading ramp is in the form of an elongated tunnel which is pivotably connected to the terminal. The tunnel extends perpendicularly to the terminal and has a cab connected at one end at right angles thereto, so that the cab and tunnel in effect form an L-shaped assembly. This assembly can be lowered and elevated and its cab can also be extended and retracted toward and away from the nose of an airplane. Since the cab is actually parallel to the terminal, when the airplane is being positioned adjacent the loading ramp, the nose of the plane and not its large wings moves toward the terminal. Accordingly, the danger of having the wings strike the terminal is avoided.

Advantageously, the elevating means may comprise a single hydraulic piston-cylinder assembly which is connected to the cab adjacent the tunnel. A stabilizing cylinder may also be provided near the hydraulic cylinder to maintain the cab and tunnel aligned. The cab may include an elevating section connected to the tunnel with the piston-cylinder assembly disposed under the section. A traversing section may be extendably and retractably connected to the elevating section with a contoured nose section disposed at the end of the traversing section. The nose section may be provided with an automatic leveler to maintain the nose level with the jet fuselage. Additionally, the nose may be pivotably connected to the traversing section to accommodate different type aircraft. The cab may also be provided with adjustable stairs so that the cab can be entered from the field regardless of the vertical disposition of the cab.

Novel features and advantages of the present invention will become apparent to one skilled in the art from a reading of the following description in conjunction with the accompanying drawings wherein similar reference characters refer to similar parts and in which:

FIG. 1 is a perspective view of one embodiment of this invention;

FIG. 2 is an end view of the embodiment shown in FIG. 1 with the aircraft indicated in phantom;

FIG. 3 is a view similar to FIG. 2 in a different phase of operation;

FIG. 4 is a plan view of the embodiment of this invention shown in FIGS. 1–3;

FIGS. 5–6 are side views of the embodiment shown in FIGS. 1–4 in different phases of operation;

FIG. 7 is a schematic view of the hydraulic system for the embodiment shown in FIGS. 1–6;

FIG. 8 is a schematic view of the electrical system for the embodiment of the invention shown in FIGS. 1–6; and FIGS. 9–14 are various modifications of the nose seal shown in FIGS. 1–6.

As shown in FIG. 1, the loading ramp 10 is a hydraulically operated device which bridges the gap from for example the passenger terminal 12 to the jet aircraft 14. Ramp 10 provides a safe quiet weatherproof walkway to the aircraft door when the plane 14 is parked in the terminal area. As indicated in FIG. 1 while the plane is being parked its wings are disposed remote from, and its nose toward, the terminal.

Ramp 10 essentially consists of four major sections including the tunnel 16, the elevated cab 18, the traversing section 20 and the contoured nose 22. Tunnel 16 is hinged (as most clearly shown in FIGS. 5–6) at the terminal door sill. This hinge permits the slight amount of movement necessary to provide a smooth transition from the terminal floor level to the aircraft deck. Bellow joints 24 assures that tunnel 16 is maintained closed when the ramp is for example lowered as shown in FIG. 5.

Cab section 18 is raised and lowered hydraulically by the single cylinder-piston assembly 26. A stabilizing cylinder piston assembly 28 however is also provided to maintain the cab and tunnel aligned. Access may be had to cab 18 not only from the tunnel to the cab 18 but also from the airfield itself through stairs 30 and doorway 32. Advantageously, stairs 30 are provided with adjustable rungs 34 so that the rungs are horizontal regardless of the vertical disposition of cab section 18 as shown for example in FIGS. 5 and 6. The lowest rung is also provided with rollers 36 so that the stairway 30 may smoothly slide along the ground when the cab is being raised or lowered.

Traversing section 20 is a telescopic section connected to cab 18 and is actuated by piston-cylinder assembly 68 (FIG. 7) so that traversing section 20 may be extended to contact the aircraft or retracted when the loading or unloading operation is completed. When cab section 18 is raised or lowered by piston cylinder assembly 26, the tunnel pivots but the movement of traversing section 20 is always horizontal.

The nose section 22 is connected to traversing section 20 and includes a foam tip which is contoured to fit the fuselage of standard aircraft. Advantageously, the inclusion of this foam tip enables section 22 to accommodate variously shaped aircraft. Nose section 22 is also capable of swiveling or pivoting for example 16° horizontally on either side of the center line of the cab elevating and traversing sections 18 and 20. As most clearly shown in FIG. 4 nose section 22 includes a rounded portion 23 which snugly fits into traversing section 20 similar to a ball joint. Rounded portion 23 of nose section 22 are biased to a central position but are capable of for example the 16° movement on either side of the cab center line. When for example, the plane is at a slight angle to ramp 10 and traversing section 20 is extended so that nose section 22 contacts the plane, the action of the nose 22 contacting the plane will cause the nose to pivot from its central position if necessary to accommodate the plane configuration. This makes it possible to secure a positive seal to the aircraft regardless of the parking angle of plane 14.

A rubber bumper 38 mounted at the doorsill prevents damage to the aircraft fuselage. To assure further safety to the plane a cutout 39 in the cab floor also protects the aircraft door, in case of differential vertical movement between ramp 10 and aircraft 14. With this arrangement it is also possible to fully open and close the aircraft door when the ramp is positioned against the aircraft.

An automatic leveling device 40 is provided on each side of nose 22. This device automatically maintains the ramp 10 at a constant level with the fuselage and prevents damage to the plane's door. These levelers include a switch which is disposed slightly inwardly from the outer edge of the foam tip of nose 22 as most clearly shown in FIGS. 2 and 3. Since nose 22 is made for example of compressible foam material auto-leveler switches 40 are contacted by the plane when nose 22 is pressed against it. This sets off for example a visual signal to the operator. Accordingly, if for example, as shown in FIG. 3 the ramp 10 and airplane 14 are not properly aligned, the plane cannot contact auto-levelers 40. Since the visual signal is not set off, the operator must thereby manipulate the controls until the auto-levelers are contacted as shown in FIG. 2.

Operation

As shown in FIGS. 7–8, operation of the loading ramp 10 is initiated by inserting, for example, a key into the "ON-OFF" key-operated selector switch 42 and rotating to "ON" then depressing the "START" switch 44 momentarily. This applies power to control relay 1CR, which closes its contacts to apply power for the operation of the controls.

The "Emergency Stop" button 46 breaks the circuit to the coil of 1CR, cutting off all controls, except through to the auto-leveler 40. The application of power to the control system is indicated, for example by a red pilot light on the control panel provided in the elevating section 18 of the cab.

Raising the cab

Moving the bat handle "UP-DOWN" switch 48 (spring return to off) to the "UP" position energizes the coil of relay 2CR. One contact of 2CR closes the circuit to pneumatic timing relay 1TR. (This relay closes the circuit to the magnetic contactor coil 49 instantly when energized, but delays opening the coil circuit when de-energized to keep the pump running for the hydraulic pilot until all solenoids and pilot-operated valves have re-acted.) Another contact of 2CR energizes solenoid 56 (FIG. 7) allowing it to shift, under pilot fluid control for acceleration, to raise the cab 18.

The magnetic contactor coil 49, by energizing the motor 50 (FIG. 7) starts both pumps 52 and 54. (If the "IN-OUT" valves are centered, the small pump 54 will run free, maintaining pressure but no flow.) The large pump 52 provides pressure to the pilot line of solenoid 56 and slowly shifts the spool of solenoid 56 to allow increasing flow into the cylinder, through the check valve 58 which is open to free flow in the "UP" direction.

To stop the upward motion of the cab, either the operator will allow the bat handle switch 48 to return to center (off), breaking the circuit to 2CR; or either of the duplicate limit switches 3LS and 4LS will break the same circuit as the leveler approaches the upper limit of travel. Breaking 2CR will break the circuit to solenoid 56, and 1TR. This will permit solenoid 56, under the same pilot deceleration control, to return to center, cutting off all flow and, after a slight delay, provided by 1TR, the magnetic contactor coil 49 will de-energize the motor, stopping the pumps.

Lowering the cab

Moving the bat handle "UP-DOWN" switch 48 to "DOWN" energizes control relay 3CR, which turns on the pumps through relay 1TR (as described above) and energizes solenoid 60; solenoid 60 will shift (under pilot acceleration control) to connect the lift cylinder 26 to the dump (reservoir) line and connect the pilot of the pilot operated check valve 58 to the pump pressure, which opens the check valve and permits the cylinder to lower.

To stop the lowering action, either the operator releases the switch 48 allowing it to return to center (off) thus breaking the circuit to relay 3CR; or either of the duplicate limit switches 5LS and 6LS will break down the same circuit as the cab approaches the lower limit of travel. De-energizing 3CR then de-energizes solenoid 60 and timing relay 1TR, which decelerates and stops the downward motion in the same manner as described for the up motion.

Extending the cab

Moving the handle 62 of the "IN-OUT" switch to "OUT" closes the circuit to relay 4CR, which in turn energizes solenoids 64 and 66 and turns the pumps on (through timing relay 1TR).

As the pressure from the pump builds up, before solenoids 64 and 65 shift, fluid is delivered to the hydraulically operated check valves, immediately shifting them to open the ports of the cylinder to the solenoid valves. These check valves lock the fluid in the cylinder whenever the pump is off to prevent leakage through the solenoid valve spools.

When the coils of solenoids 64 and 65 are energized, they will both shift, under pilot control for acceleration to connect the head end (left end in FIG. 7) of the double acting cylinder 68 (which is connected to move section 20) to the pressure and the rod end of the cylinder to the dump. Fluid then is pumped into the cylinder, shifting it outward, and the rod-end fluid is expelled to the reservoir.

At any time the operator may release the "IN-OUT" switch 62 and traversing section 20 will decelerate and stop. Normally, however, the operator will hold this switch and permit the aircraft to stop the out motion as follows.

As the front of the canopy of nose 22 on either side, touches the aircraft, limit switches 11LS and/or 12LS, in the auto-levelers will be operated by the aircraft. Either of these switches will close the circuit to relay 7CR, which breaks the circuits through the "UP-DOWN" switch 48 and also cuts off power to solenoid 64. This prevents any up or down motion, regardless of the operation of the "UP-DOWN" switch, as long as one auto-leveler has contacted the aircraft. (If the vertical positioning is wrong, the operator must retract the cab and then reposition vertically.) As shown in FIG. 2 auto-levelers 40 are disposed slightly inwardly of the edge of nose 22 so that the auto-levelers 40 are contacted by the aircraft 14 after nose 22 is pressed against it.

By de-energizing solenoid 64 the cab 20 is decelerated from the high speed motion to a low speed or inching motion controlled through solenoid 68, by the flow control valve 70. The cab traversing section 20 will continue to move outward at a slow speed, allowing the canopy nose 22 time to swivel and to seal to the aircraft 14. As the canopy nose 22 approaches final position, sealed against the aircraft 14 switches 1LS and 2LS, one in each auto-leveler 40 will be closed. When both are closed, relay 6CR is energized. 6CR breaks the circuit to 4CR, shutting off the pump and solenoid 66 which decelerates and stops the cab motion.

When 4CR relay is de-energized and 6CR is energized, the auto-levelers 40 are actuated and will hold position on the aircraft through limit switches 7LS, light for example on the control panel in the cab indicates that the auto-levelers 40 are operational.

If no aircraft is in position when the "OUT" switch is actuated, limit switches 13LS or 14LS cut off power to 4CR as the cab approaches full extension and the cab traversing section 20 decelerates to a stop.

*Retracting the cab traversing section*

Moving the "IN-OUT" switch 62 to the "IN" position energizes control relay 5CR, which starts the pump 54 through timing relay 1TR and energizes solenoid 72. Solenoid 72 under pilot controlled acceleration, connects pressure to the rod end of the cylinder 68 and dumps the head end, retracting the cab traversing section 20.

To stop the cab retraction, the operator may release the switch 62 to center (off), breaking relay 5CR. If he does not, limit switches 15LS and/or 16LS are opened as the cab approaches the stored position, breaking the circuit to 5CR. Through solenoid 72 and Timing Relay 1TR, the cab decelerates and stops in the stored position.

*Mechanical safety points*

In case of a power failure, the cab may be retracted by use of the hand pump 74 which pumps fluid into the rod end of the cylinder 68. The pump 74 is connected to the rod end of the cylinder by a globe valve 76 and the head end is connected to the dump line through another globe valve which must be manually opened to connect the pump into the circuit.

The "IN-OUT" cylinder 68 incorporates hydraulic "cushions" at either end, so if all limit switches fail, a reasonable deceleration will occur before the cylinder reaches the end of its stroke, in either direction. Since the force in the "IN-OUT" cylinder is only slightly higher than needed to seal the canopy cushions 22 against the aircraft, a limit switch failure when an aircraft is in loading position will not cause undue shock as the foam cushions will provide deceleration as they compress against the aircraft.

As shown in FIG. 7 the hydraulic circuit consists of a 20 H.P. motor 50 operating two, fixed pressures, variable volume pumps 52, 54 one for the main lift cylinder 26 and the other for the four inch, double acting traverse cylinder 68. The first pump 52 provides fluid flow and pressure to operate the main lift cylinder 26. The flow to the cylinder 26 is controlled by a four-way, three-position spring-returned-to-center, pilot-operated solenoid valve 78. To raise the plunger, a signal to solenoid coil shifts the solenoid valve 56 to direct fluid to the cylinder 26 and simultaneously dumps the pilot line to the pressure operated check valve 78. In this position, fluid flows freely through the check valve 78 into the cylinder 26 and raises it. Acceleration and deceleration are achieved by the pilot line to the solenoid which is throttled to control the speed at which the valve 78 shifts, thus controlling the amount of fluid flowing and permitting it to gradually increase on opening the valve, or decrease on closing.

Lowering of the main cylinder 26 is achieved by applying a signal to solenoid 60, which shifts the pump 52 output to the pilot line, of the pressure-operated check valve 58 and simultaneously dumps the main cylinder line to the reservoir. The purpose of the pressure-operated check valve 58 is to hold the cylinder unless there is pressure in the lines to it. The absence of a pilot pressure on the check valve will hold it closed so that fluid cannot be exhausted from the cylinder 26 to permit it to dump. This means that if any line in the hydraulic system should fail the main lift cylinder 26 supporting the cab will lock in position. Acceleration and deceleration of the cylinder 26 are achieved with the same pilot line as with the raising. Note that the pump must be running to provide pilot pressure to permit lowering.

Pump controls the in and out motion of traversing section 20 by providing pressure to solenoids 64 and 72. When solenoid 64 is energized, the cab 20 will travel out as fluid is pumped into the head end of the double-acting cylinder 68 and allowed to dump from the rod end. Retraction of the cab section 20 is provided by electrically operating solenoid 72 which reverses the lines and pumps fluid into the rod end and out of the head end. This four-way, three-position spring-returned-to-center, pilot-operated solenoid valve 65 achieves acceleration and deceleration in the same manner as the up and down solenoid 78.

On the in and out cylinder 68 solenoid 65 provides high speed, rough control while solenoid 67, a four-way, two-position, spring-returned, pilot-operated solenoid provides slow "out" to permit careful final positioning at the aircraft. Here energizing solenoid 60 through the pilot acceleration and deceleration circuit affects the same operation as signaling solenoid 64, but the amount of flow is reduced by flow control valve 70 so that the cylinder 68 will extend much more slowly. Since there is no need to retract slowly, the "retracting" solenoid has been omitted from solenoid 67.

In order to retract the cab in case of emergency power failure the hand pump 74, as previously described, is provided, connected into the rod end of the cylinder through globe valve 76 with another globe valve connecting the head end of the cylinder to the dump line. By opening these globe valves and pumping the hand pump 74 the cylinder 68 may be forced to retract, thus retracting the cab traversing section 20.

To summarize the operation of the various limit switches, reference is again made to FIG. 8. Limit switches 1LA and 2LS are tripped when auto-leveler 40 is in final position. This stops outward movement and connects the circuit for automatic leveling. Limit switches 3LS and 4LS are tripped when the extreme upper limit of cylinder 26 is reached, while switches 5LS and 6LS are tripped when the extreme lower limit of cylinder 26 is reached. Switches 7LS and 9LS are tripped by auto-leveler 40 for down movement, while switches 8LS and 10LS are tripped by auto-leveler 40 for upward movement. Auto-leveler 40 trips switches 11LS and 12LS when nose 22 is, for example, within 6 to 8 inches of aircraft 14. This breaks the circuit to solenoid 64 (FIG. 7) and takes manual operation out of action. Switches 13LS and 14LS are tripped when traversing section 20 is fully extended and switches 15LS and 16LS are tripped upon full retraction of traversing section 20.

FIGS. 9–10 show a modified form of nose 22. As indicated in FIG. 9, nose 122 is made of a hypalon covered foam material which is contoured in such a manner to provide a protective seal for a wide range of aircraft. FIG. 10 shows the foam seal 122 detached from traversing section 20. The sides 124 and 126 are curved to fit snugly against the sides of the aircraft fuselage. Top 128 is also especially contoured to fit against the fuselage. As indicated most clearly in FIG. 10 the leading edge 130 of top 128 protrudes in such a manner as to fit snugly against the tapered aircraft fuselage. The contour indicated in FIGS. 9 and 10 and the foam density of the material is so selected as to effectively seal substantially all standard jet aircraft and still provide rain tightness on all of the aircraft by simply pushing the seal 122 against the fuselage. The bottom is provided with a rubber bumper 132 as shown in FIG. 9 which does not seal against the aircraft since merely sealing the sides and top is sufficient for protection against rain, wind, and other elements. The foam material used in seal 122 is particularly advantageous over for example an inflatable type seal in that a foam material can be oriented to obtain different configurations.

Seal 122 is particularly advantageous since it not only effectively seals the ramp 10 to the aircraft but also because of its shock absorbing or cushioning ability. In this respect, the electrical and hydraulic systems illustrated in FIGS. 7-8 could be modified so that when traversing section 20 is extended instead of throttling down and stopping, deceleration could be obtained by pushing the foam pad against the contoured fuselage to give a gradual increasing resistive force which slows and stops the travel of traversing section 20. Foam pad 122 thus effectuates a seal which maintains integrity with changes in aircraft vertical height (wheel suspension) due to changes in gross weight during loading and unloading.

FIGS. 11-13 show another form 132 of foam pad 122 which is especially designed to seal against cockpit windows. In this case, the leading edge 130 of FIGS. 9-10 does not project sufficiently to engage against the aircraft windshield when it is in the sealed area. Accordingly, to account for this change in aircraft contour the lead edge 134 is hinged or articulated so that it can be projected forward into sealing engagement with the windshield.

FIG. 12 shows one form of articulating foam pad 132. In this embodiment of the invention the articulated corner 134 is engaged to traversing section 20 by means of a molded contoured inflatable bladder 136. The lower end of side 127 is secured to shaft 135. Lead edge 134 is thereby projected the desired amount by pressuring bladder 136 to cause side 127 to hinge about shaft 135 and thereby articuate lead edge 134 until lead edge 134 seals against the aircraft.

FIG. 13 shows another manner of articulating seal 132. As indicated in FIG. 13 lead edge 134 is connected to traversing section 20 by means of a bellows 138. A cylinder piston assembly 140 is connected to foam seal 132 and traversing section 20 so that when the piston of assembly 140 is extended lead edge 134 is brought into engagement with the aircraft windshield.

FIG. 14 shows still another form 142 of foam seal 122. As indicated therein foam seal 142 includes an integral foam pad 144 which extends across the base of seal 142. Accordingly, this provides a complete seal against the aircraft fuselage which is particularly advantageous in for example maintaining air conditioning or providing a positive pressure in case of fire.

What is claimed is:

1. A loading ramp for bridging the gap between a terminal and an aircraft comprising a tunnel section, a pivot connection for attaching one end of said tunnel section to the terminal, an extendable cab section, a pivotal connection between said cab section and the other end of said tunnel section, elevating means for raising and lowering said cab section, a seal for engaging against the aircraft, said seal including a pair of side walls, a top wall connected to said side walls, the juncture of said top wall and one of said side walls defining a corner having a leading edge which extends outwardly away from said cab section a greater distance than the remainder of said top wall, and expandable joint means between said seal and said cab section for moving said leading edge toward and away from said cab section.

2. A loading ramp for bridging the gap between a terminal and an aircraft comprising a tunnel section, a pivot connection for attaching one end of said tunnel section to the terminal, an extendable cab section, a pivotal connection between said cab section and the other end of said tunnel section, elevating means for raising and lowering said cab section, a seal for engaging against the aircraft, pivot means connecting the lower end of said seal to said cab section, and an inflatable bladder connected between said seal and said cab section for moving said seal toward and away from said cab section about said pivot means.

3. A loading ramp for bridging the gap between a terminal and an aircraft comprising a tunnel section, a pivot connection for attaching one end of said tunnel section to the terminal, an extendable cab section, a pivotal connection between said cab section and the other end of said tunnel section, elevating means for raising and lowering said cab section, a seal for engaging against the aircraft, pivot means connecting the lower end of said seal to said cab section, a bellows joint connected between said seal and said cab section, and a piston-cylinder assembly connected to said seal and to said cab section across said bellows joint for moving said seal toward and away from said cab section about said pivot means.

References Cited

UNITED STATES PATENTS

| | | | |
|---|---|---|---|
| 2,581,293 | 1/1952 | Read et al. | 14—72 |
| 2,875,457 | 3/1959 | Read et al. | 14—71 |
| 2,929,655 | 3/1960 | Huter. | |
| 3,038,185 | 6/1962 | Moore | 14—71 |
| 3,060,471 | 10/1962 | Der Yuen et al. | 14—71 |
| 3,086,152 | 4/1963 | Lodjic et al. | 14—72 X |
| 3,099,847 | 8/1963 | Lodjic et al. | 14—71 |
| 3,110,048 | 11/1963 | Bolton | 14—71 |
| 3,184,772 | 5/1965 | Moore et al. | 14—71 |
| 3,263,253 | 8/1966 | Wollard. | |

JACOB L. NACKENOFF, *Primary Examiner.*